US009211471B2

(12) United States Patent
Bodner

(10) Patent No.: US 9,211,471 B2
(45) Date of Patent: Dec. 15, 2015

(54) BRAKING DEVICE FOR ROLLER SKATES, SKATEBOARDS, OR THE LIKE

(75) Inventor: Peter Bodner, Baldramsdorf (AT)

(73) Assignee: Peter Bodner, Baldramsdorf (AT)

( * ) Notice: Subject to any disclaimer, the term of this patent is extended or adjusted under 35 U.S.C. 154(b) by 38 days.

(21) Appl. No.: 14/130,985

(22) PCT Filed: Jun. 19, 2012

(86) PCT No.: PCT/AT2012/050082
§ 371 (c)(1),
(2), (4) Date: Jan. 6, 2014

(87) PCT Pub. No.: WO2013/003875
PCT Pub. Date: Jan. 10, 2013

(65) Prior Publication Data
US 2014/0131146 A1    May 15, 2014

(30) Foreign Application Priority Data
Jul. 6, 2011   (AT) .................................. A 988/2011

(51) Int. Cl.
*F16D 51/20*   (2006.01)
*F16D 55/02*   (2006.01)
*A63C 17/14*   (2006.01)
*F16D 125/28*  (2012.01)
(Continued)

(52) U.S. Cl.
CPC ......... *A63C 17/1409* (2013.01); *A63C 17/1427* (2013.01); *A63C 17/01* (2013.01); *A63C 17/06* (2013.01); *F16D 51/20* (2013.01); *F16D 2125/28* (2013.01)

(58) Field of Classification Search
CPC .... A63C 17/14; A63C 17/409; A63C 17/427; F16D 51/18; F16D 51/20; F16D 51/22; F16D 2125/26; F16D 2125/28; F16D 2125/30; F16D 2125/32
USPC ........ 188/325, 328, 329, 330, 342, 343, 71.2; 280/11.204, 11.205, 11.211, 11.214, 280/11.215
See application file for complete search history.

(56) References Cited

U.S. PATENT DOCUMENTS 3,871,672 A * 3/1975 Bardy ....................... 280/11.204
3,904,215 A * 9/1975 Bardy ....................... 280/11.212
(Continued)

FOREIGN PATENT DOCUMENTS

DE    196 16 641 A1    10/1997
DE    198 37 364 A1    3/2000
(Continued)

OTHER PUBLICATIONS

International Preliminary Report on Patentability dated Jan. 7, 2014.
(Continued)

*Primary Examiner* — Thomas J Williams
(74) *Attorney, Agent, or Firm* — Hoffmann & Baron, LLP

(57) ABSTRACT

Braking device for roller skates, skateboards, or the like, having a roller support in which a roller is mounted axially movable between a first freely rotatable position and a second braked position. The braking device includes an actuatable brake unit is supported relative to the roller support and the brake actuation force is produced from the torque of the roller via a clutch unit having a downstream transmission unit, the clutch unit being open in the first position and closed in the second position.

16 Claims, 4 Drawing Sheets

(51) Int. Cl.
    *A63C 17/01*     (2006.01)
    *A63C 17/06*     (2006.01)

(56) References Cited

U.S. PATENT DOCUMENTS

| | | | | |
|---|---|---|---|---|
| 5,351,974 | A | * | 10/1994 | Cech .................... 280/11.212 |
| 5,401,038 | A | * | 3/1995 | Peck et al. ............ 280/11.206 |
| 6,102,168 | A | | 8/2000 | Brandriff et al. |
| 2003/0146586 | A1 | * | 8/2003 | Hurwitz ................ 280/11.221 |
| 2007/0170017 | A1 | * | 7/2007 | Brandriff et al. ........ 188/71.5 |

FOREIGN PATENT DOCUMENTS

| | | |
|---|---|---|
| DE | 100 48 786 A1 | 10/2002 |
| DE | 103 33 378 A1 | 2/2005 |
| GB | 1433268 A * | 4/1976 |
| WO | WO 2006/083102 A1 | 8/2006 |

OTHER PUBLICATIONS

ISA Written Opinion for PCT/AT2012/050082 dated Jun. 19, 2012.

\* cited by examiner

BRAKING DEVICE FOR ROLLER SKATES, SKATEBOARDS, OR THE LIKE

CROSS-REFERENCE TO RELATED APPLICATIONS

This application is a National Phase application of International Application No. PCT/AT2012/050082 filed Jun. 19, 2012 which claims priority to Austrian Patent Application No. A 988/2011 filed Jul. 6, 2011, the disclosures of which are incorporated herein by reference.

The present invention relates to a braking device for roller skates, skateboards, or the like, having a roller support in which a roller is mounted axially movable between a first freely rotatable position and a second braked position.

BACKGROUND

Today roller skates, especially in-line skates, and skateboards are often braked by means of a rubber stopper mounted in the heel area or, for skateboards, in the rear area, the stopper being positioned against the ground when the front rollers are lifted. Disadvantages are limited steerability when braking, high wear on the rubber stopper, and the applying force when raising the foot during lengthy descents or if the ground is noticeably uneven.

In the prior art, brakes that act on at least one of the rollers of a roller skate or skateboard are known that are actuated manually by means of a lever (see e.g. DE 100 48 786 A1) or by means of a clamp on the lower leg of the skater (e.g. DE 103 33 378 A1). Such systems require a special body posture during braking that must be learned and must be adapted to the skater.

Known from WO 01/64302 A1 is pivoting a roller against its rotational axle by applying an axial force, which leads to friction on the roller in its bearing frame on the roller skate and thus causes a braking action.

U.S. Pat. No. 6,102,168 provides a disk brake module that is like a type of a multi-disk coupling and that is arranged in a roller. If an axial force is applied to the roller by inclining it, thus axially displacing the roller, the multi-disks are pressed together and the wheel is thus braked. The pressure acting on the brake disks corresponds to the axial force acting on the roller, and thus for stronger braking maneuvers requires that the roller skate be in a more inclined position, which then leads to unstable skating and heavy asymmetrical wear on the roller.

SUMMARY

The underlying object of the invention is to overcome these disadvantages and to make possible force saving, ergonomic operation of a brake in order to be able to effectively reduce the skating speed with a low amount of force in an easily controllable manner.

This object is attained with a braking device of the type specified in the foregoing, which braking device is distinguished by an actuatable brake unit that is supported relative to the roller support and the brake actuation force of which is produced from the torque of the roller via a clutch unit having a downstream transmission unit, the clutch unit being open in the first position and closed in the second position.

In accordance with the invention, the brake actuation force is produced from the rotational movement of the roller by decoupling a torque—the braking device is practically "self-amplifying." Due to the clutch unit and transmission unit, a high braking force and thus a strong braking action may be attained even at less of an inclined position and thus at lower axial force; the roller skate or skateboard continues to skate in a stable manner that is easy to control.

In order to prevent inadvertent braking while skating, the roller is preferably spring-loaded towards the first position relative to the roller support. The first position, in which the roller is freely rotatable, thus becomes the default position that the roller assumes in the absence of an axial force.

The clutch unit preferably has two coupling surfaces that are normal to the axle of the roller and can be brought into frictional engagement with one another, of which surfaces the first is joined rotation-fast to the roller and the second is borne pivotable or rotatable about the axle so that torque can be decoupled. Thus the roller assumes some of the coupling function and the braking device may be constructed with fewer parts and more compactly.

The coupling surfaces are particularly preferably arranged radially within the brake surfaces of the brake unit. This enables larger brake surfaces that attain greater braking torque, and thus greater braking action, at the same brake actuation force.

It is advantageous when a disk spring disposed between a first and second coupling surface is provided. Such a disk spring separates the two coupling surfaces when the axial force decreases and presses the roller into its first position. Additional spring-loading of the roller towards the first position may be omitted, which enables particularly short paths between the first and second positions of the roller and thus to braking control.

In another preferred embodiment of the invention, the transmission unit has a cam driven by the output of the clutch unit, which cam acts on a lever for producing the brake actuation force. Thus the ratio of decoupled torque to brake actuation force produced may be preselected in the design using the selection of cam pitch and length of lever arm. At the same time, the use of a cam enables braking actuation that is independent of wear, e.g. of the brake surfaces for the brake unit, since the cam compensates this effect.

To facilitate the return of the cam after braking, the cam may also be spring-loaded against its actuation direction.

If even greater brake actuation force is desired, the transmission unit may further have a gear acting between clutch unit and cam.

The brake unit is preferably a drum brake having at least two brake shoes that are actuated by the lever and that act on a brake drum formed by the roller. This results in a particularly compact structure for the braking device that is also closed and thus may be protected from contamination so that it is robust and durable.

Alternatively, the brake unit may be a disk brake having at least two brake pads that are actuated by the lever and that act on a brake disk embodied on the roller. A brake disk leads to a more uniform distribution of braking force, may be embodied such that it is adjustable, and is not as heavy as a drum brake.

In one advantageous variant, the brake shoes or brake pads are spring-loaded against the brake actuation force. Because of this, when there is no brake actuation force they open the brake automatically; in this manner it is possible to prevent undesired wear or blocking while skating.

The braking device is particularly preferably constructed integrated, the axle of the roller being joined rotation-fast to the roller support and a disk-like brake support being seated on it that bears both the lever and the brake shoes or brake pads actuated thereby. Thus it is possible to exchange the entire braking device in a simple manner by changing axle and roller support. Existing roller skates and skateboards may be retrofitted with a braking device in accordance with the invention with no problem.

BRIEF DESCRIPTION OF THE DRAWINGS

The invention shall be described in greater detail in the following using exemplary embodiments depicted in the attached drawings.

DETAILED DESCRIPTION

Figure 1:
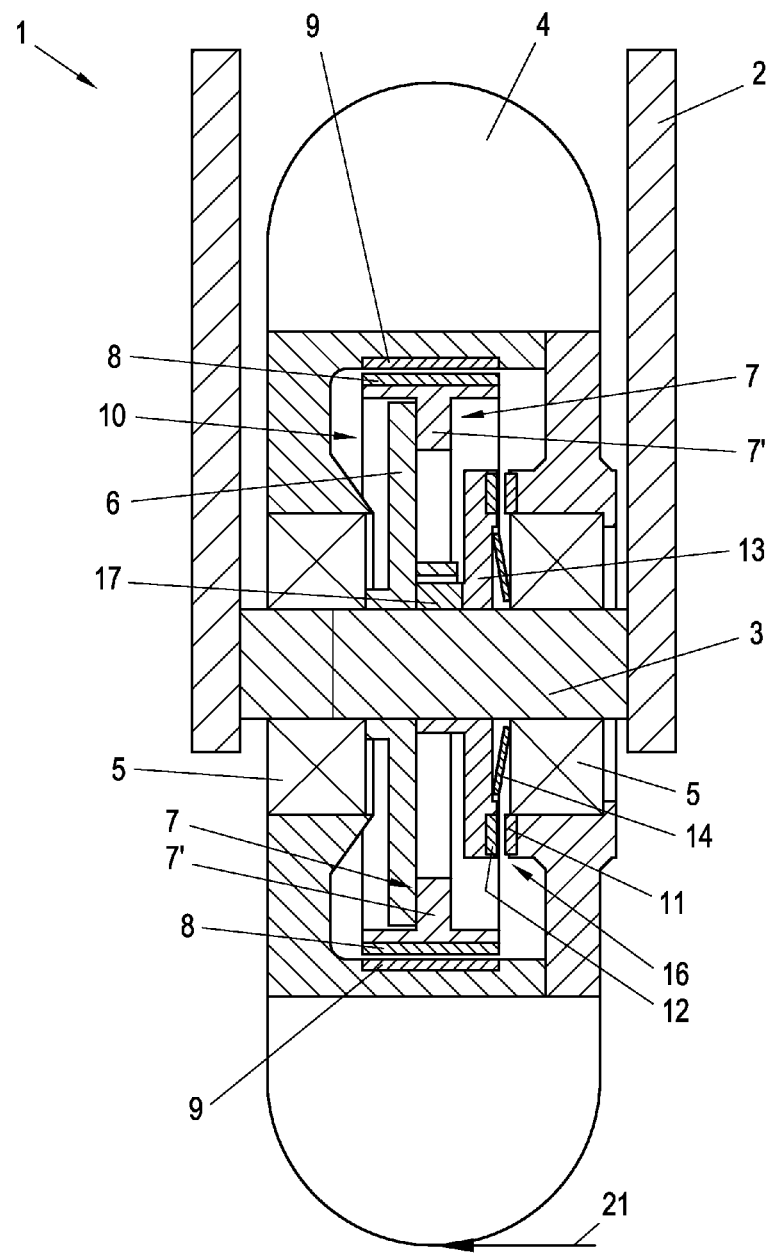
FIG. 1 is a cross-section along the rotational axis of one exemplary embodiment of the inventive braking device in its non-actuated state.
Figure 2:
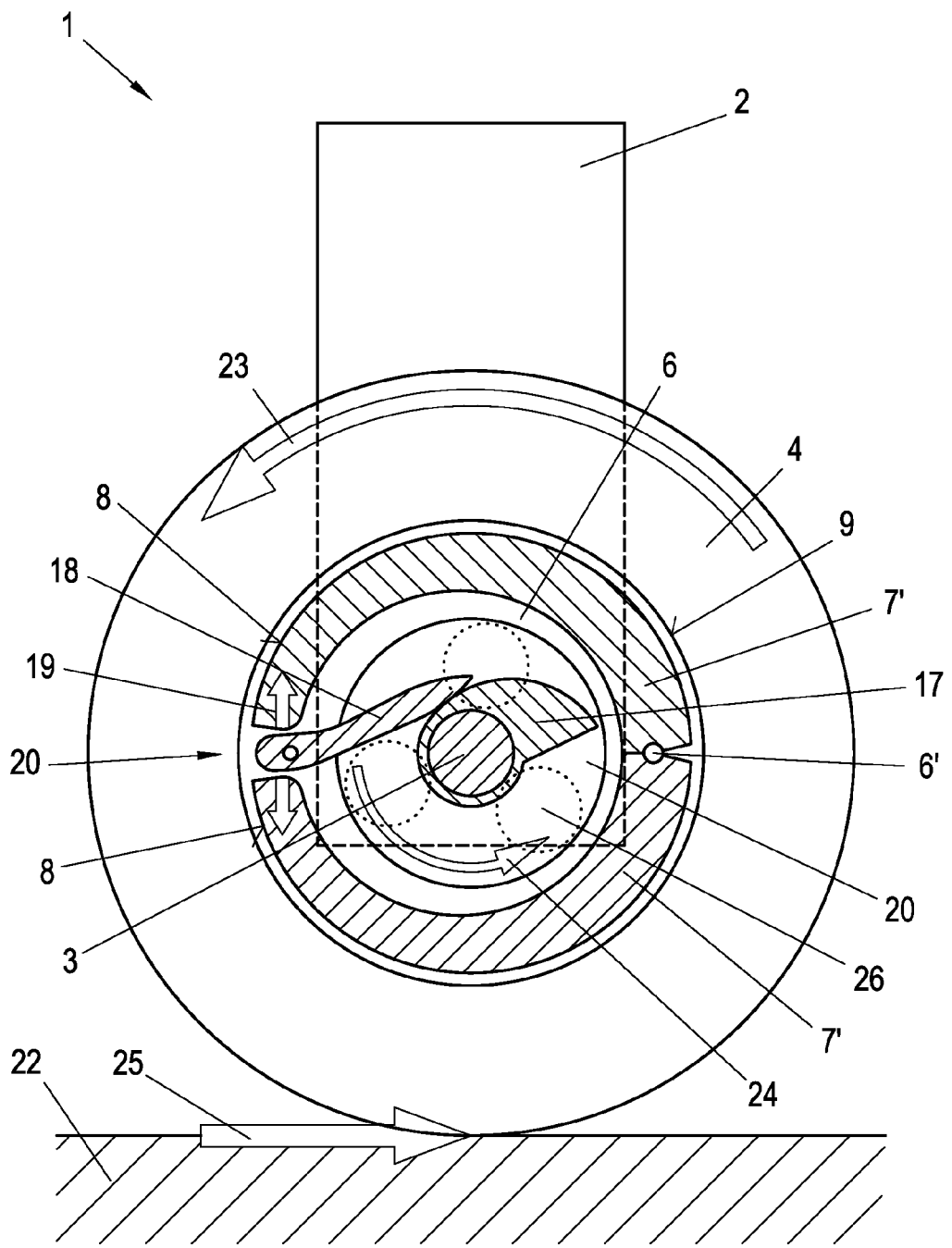
FIG. 2 is a cross-section of the braking device in FIG. 1, normal to the rotational axis.

FIGS. 1 and 2 depict an inventive braking device 1 for roller skates, in-line skates, skateboards, or the like, having a roller support 2 in which an axle 3 is fixed. A roller 4 is mounted rotatable and axially movable on the axle 3 by means of two bearings 5. Alternatively, the roller 4 could be rotation-fast with the axle 3 and the latter could be mounted rotatable and axially movable in the roller support 2 (not shown).

Seated rotation-fast on the axle 3 is a somewhat disk-shaped brake support 6 that carries a brake element 7. In the embodiment depicted in FIGS. 1 and 2, the brake element 7 is formed by two brake shoes 7' of a drum brake that are borne on the brake support 6 at 6' such that they can pivot radially outward and on their outer peripheral surfaces form first brake surfaces 8. A second brake surface 9 that surrounds the brake shoes 7' at an interval with the braking device 1 in the depicted non-actuated position is disposed on an inner cylinder embodied in the roller 4. The brake support 6, the brake element 7 with the first brake surfaces 8, and the second brake surface 9 form a brake unit 10.

Radially inside its brake surface 9 the roller 4 furthermore has a circular coupling surface 11 that is normal to the axle 3. Disposed parallel to the first coupling surface 11, approximately congruent, and, when the braking device 1 is at an interval in the non-actuated position, opposing it, is a second coupling surface 12. The second coupling surface 12 is seated on a coupling disk 13 that is borne rotational, or at least pivotable, about the axle 3. First and second coupling surfaces 11, 12 are separated by a spring element 14, e.g. a disk spring. The coupling disk 13, the spring element 14, and the two coupling surfaces 11, 12 form a clutch unit 16.

Seated at the output of the clutch unit 16 and driven by its coupling disk 13 is a cam 17 that acts on a lever 18 pivotably borne on the brake support 6 to produce an actuating force 19 for the brake unit 10. Cam 17, lever 18, and brake support 6 together form a transmission unit 20. In an alternative embodiment (not shown), the lever 18 could be omitted and the cam 17 could act directly on the brake unit. In simple cases, the transmission unit 20 may also therefore be formed by the cam 17 (and its bearing) or some other movable member for force transmission.

Together with its bearings 5, the roller 4 is axially displaceable on the axle 3 between a first position, in which it is freely rotatable about the axle 3 and strikes one of the bearings 5 (in FIG. 1, the left bearing 5) on the brake support 6, and a second position, in which the two coupling surfaces 11, 12 of the clutch unit 16 are frictionally engaged with one another. Alternatively, the bearings 5 could also be axially fixed and the roller 4 could be axially displaceable with respect to the bearings 5 between the two positions.

Figure 3A:
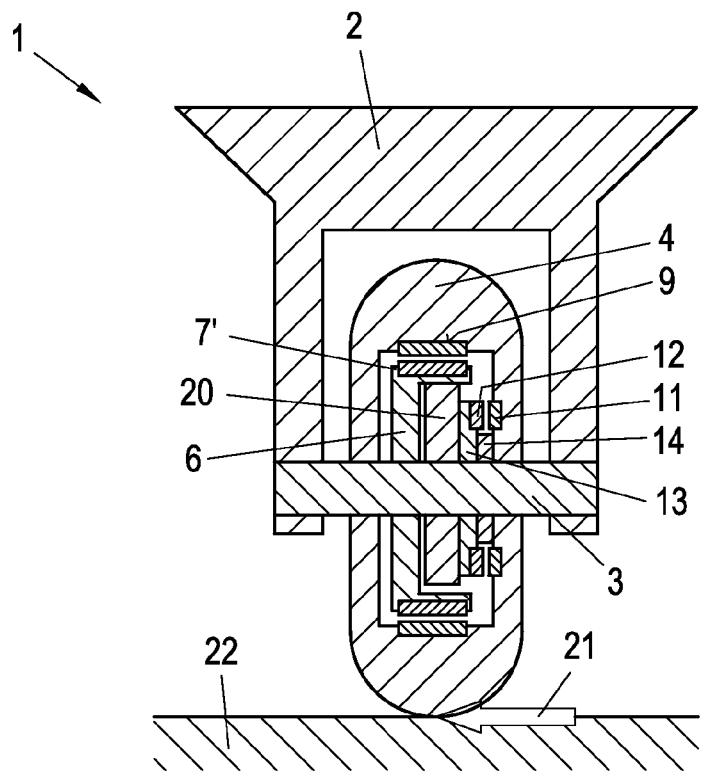
FIGS. 3a and 3b diagram the function of the braking device in FIGS. 1 and 2, depicting it in its non-actuated state (FIG. 3a) and in its actuated state (FIG. 3b); and, FIGS. 4 and 5 are alternative exemplary embodiments of the inventive braking device having a drum brake (FIG. 4) or a disk brake (FIG. 5) integrated into a roller support, each depicted schematically in a cross-section along the rotational axis.
Figure 3B:
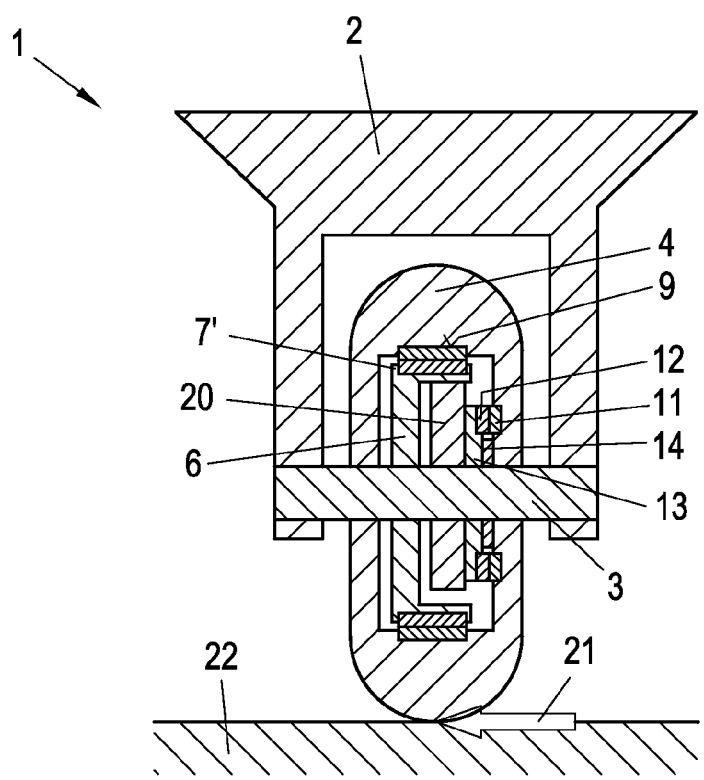

FIGS. 3a and 3b provide a simplified depiction of how the braking device 1 functions, using both positions of the roller 4.

In FIG. 3a the roller 4 is in the first position in which it is freely rotatable about the axle 3. The two coupling surfaces 11, 12 are spaced apart from one another so that they are not transmitting any torque. The braking device 1 is not actuated right now: The first brake surfaces 8 of the brake element 7 are not positioned against the second brake surface 9 of the roller 4, the brake unit 10 is open. The roller 4 is held in this first position by the spring element 14.

In FIG. 3b a lateral force 21 that exceeds the resilient force of the spring element 14 acts axially on the roller 4. Such a lateral control force 21 may be produced e.g. by tilting the roller 4 rolling on the ground/floor 22, either by tilting the roller skate or skateboard about its longitudinal axis and/or by rotating it about its vertical axis. This displaces the roller 4 axially on the axle 3 and the two coupling surfaces 11, 12 come to be frictionally engaged with one another so that the coupling disk 13 decouples some of the torque 23 the roller 4 experiences from the ground/floor 22.

The coupling disk 13 at the output of the clutch unit 16 drives the cam 17 with the decoupled torque 24. The driven cam 17 further acts on the lever 18, which transmits the brake actuation force 19 onto the brake element 7; the first brake surfaces 8 of the brake shoes 7' are pressed against the second brake surface 9 of the roller 4 with the brake actuation force 19 and the brake unit 10 is closed. The braking device 1 is now actuated. A braking force 25 opposing the travel direction may be built up between roller 4 and ground/floor 22; the roller skate or skateboard is braked.

As may be seen from the exemplary shape of the cam 17 in FIG. 2, when there is a large amount of decoupled torque 24, the cam 17 is rotated about a wider angle, so that its action on the lever 18, and thus the brake actuation force 19 and the braking force 25, increases. The magnitude of the decoupled torque 24 is a function of the lateral control force 21 and the strength of the frictional engagement of the coupling surfaces 11, 12. Depending on the structural design, e.g. the pitch of the cam 17, the arm length of the lever 18, the position, size, and friction factor for the coupling surfaces 11, 12, and the configuration of the brake unit 10, a large amount of torque 24 may be decoupled with just a small lateral control force 21 or a high brake actuation force 19, and thus a high braking force 25, may be produced even with a small amount of decoupled torque 24. The braking device 1 essentially uses the torque 23 from the roller 4 for "self-amplification."

To increase the brake actuation force 19 even further, the transmission unit 20 could furthermore have a gear 26 acting between clutch unit 16 and cam 17, e.g. a planetary gear, spur gear, or cable gear as drawn in with broken lines in FIG. 2. Alternatively (not shown), the cam 17 could also itself be replaced by a cable that is driven by the clutch unit 16 and that acts directly on the lever 18, or such a cable could also replace the lever 18 and act directly on the brake element 7.

If the lateral control force 21 is reduced, the decoupled torque 24 is reduced, and consequently so are the pivot angle of the cam 17, the position of the lever 18, and thus the brake actuation force 19 and the braking force 25. If the lateral control force 21 drops below the force of the spring element 14, the frictional engagement of the clutch unit 16 is released entirely. Cam 17, lever 18, and brake shoes 7' pivot into their respective starting positions according to FIGS. 2 and 3a and the roller 4 is freely rotatable again.

To further facilitate the release of the brake unit 10, the braking device 1 also (in addition to the spring element 14) also optionally has a restoring element (not shown) that uses spring loading to move the brake shoes 7' against the brake actuation force 19 and/or the cam 17 against its actuation direction and thus returns the brake unit 10 to the non-actuated starting position.

FIGS. 1, 3a and 3b illustrate that the coupling surfaces 11, 12 are arranged radially inside the brake surfaces 8, 9 and may be smaller than they are in terms of their surface area since the interposing transmission unit 20 increases the force of the torque 24 decoupled by them on the braking force 25 of the brake surfaces 8, 9.

Figure 4:
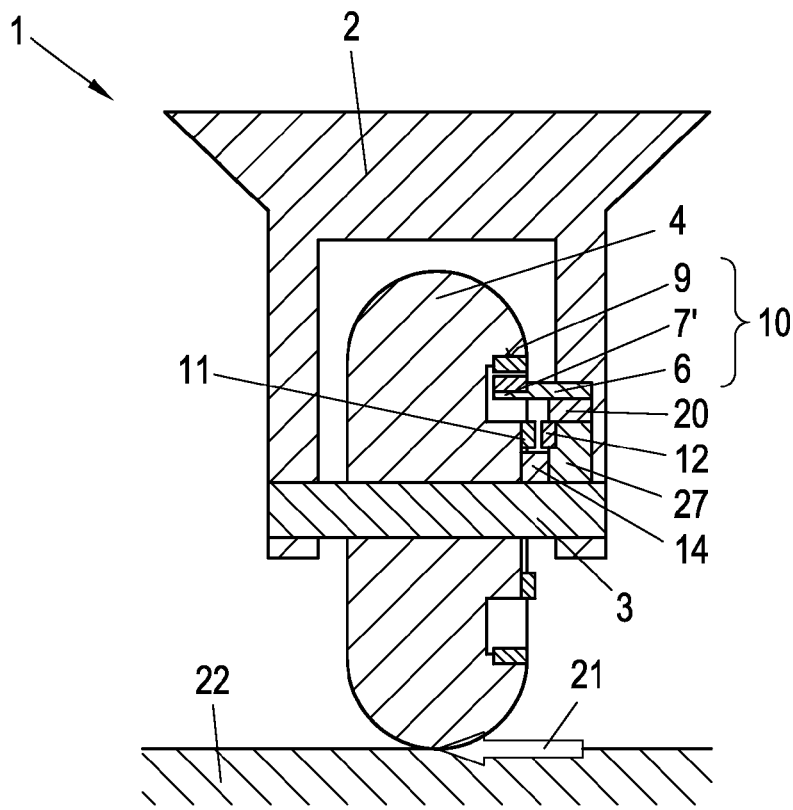

FIG. 4 depicts an alternative embodiment of the braking device 1 in which a coupling element 27 of the clutch unit 16 carrying the second coupling surface 12 is seated on the roller support 2 adjacent to the transmission unit 20 (which is shown only schematically), which, via the brake support 6, also mounted here in the roller support 2, acts on the brake element 7, which acts on the second brake surface 9 of the roller 4.

The brake unit 10 in FIG. 4 is again a drum brake, but it may alternatively also be another friction brake, the roller 4 also carrying where necessary the second brake surface 9 on a lateral surface and/or an external circumference embodied to this end (not shown).

Figure 5:
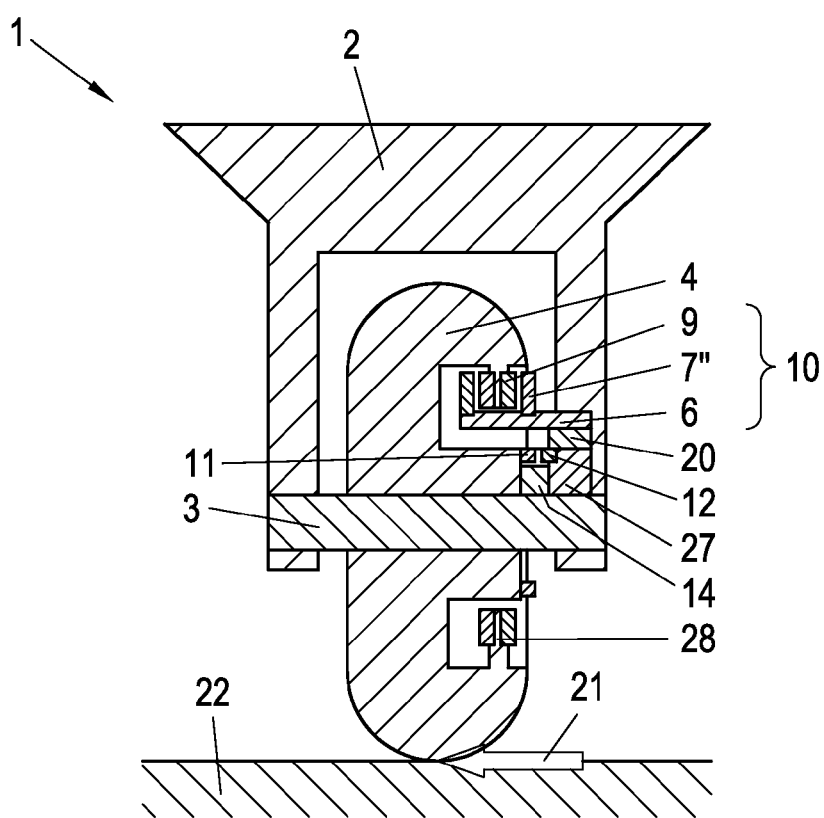

FIG. 5 depicts an additional embodiment of the braking device 1 in which the brake unit 10 is a disk brake having at least two brake pads 7" that are actuated via the transmission unit 20 and that wrap around the edges of a brake disk 28 embodied on the roller 4 with brake surfaces 9 on both sides. In the case of a disk brake, the brake pads 7" could be spring-loaded against the brake actuation force 19 by the restoring element The invention is not limited to the depicted embodiments, but rather includes all variants, combinations, and modifications that fall within the scope of the attached claims. Thus in the embodiment with the brake disk, brake unit 10, clutch unit 16, and transmission unit 20 could also be arranged in the interior of the roller 4, similar to what FIG. 1 depicts for the braking device 1 with drum brakes. Furthermore, the roller 4 may have a flattened running surface, in contrast to the depicted rounded running surface shown in the cross-section. Naturally the braking device 1 may also replace more than one or even all conventional rollers in a roller skate or skateboard.

What is claimed is:

1. A braking device for roller skates, skateboards, or the like, comprising:
a roller support, a roller mounted axially movable in the roller support between a first freely rotatable position and a second braked position, and an actuatable brake unit that is supported relative to the roller support, wherein a brake actuation force of the brake unit is produced from a torque of the roller via a clutch unit having a downstream transmission unit, the clutch unit being open in the first position and closed in the second position, and wherein the roller is spring-loaded towards the first position relative to the roller support.

2. The braking device according to claim 1, wherein the clutch unit has two coupling surfaces that are normal to an axle of the roller and can be brought into frictional engagement with one another, of which coupling surfaces the first is joined rotation-fast to the roller and the second is borne pivotable or rotatable about the axle so that torque can be decoupled.

3. The braking device according to claim 1, wherein the clutch unit has two coupling surfaces that are normal to an axle of the roller and can be brought into frictional engagement with one another, of which coupling the first is joined rotation-fast to the roller and the second is borne pivotable or rotatable about the axle so that torque can be decoupled.

4. The braking device according to claim 3, wherein the coupling surfaces are arranged radially within the brake surfaces of the brake unit.

5. The braking device according to claim 3, wherein a disk spring that acts between the first and second coupling surfaces is provided.

6. The braking device according to claim 1, wherein the transmission unit has a cam driven by an output of the clutch unit, which cam acts on a lever for producing the brake actuation force.

7. The braking device according to claim 6, wherein the cam is spring-loaded against its actuation direction.

8. The braking device according to claim 6, wherein the transmission unit further has a gear acting between the clutch unit and cam.

9. The braking device according to claim 6, wherein the brake unit is a drum brake having at least two brake shoes that are actuated by the lever and that act on a brake drum formed by the roller.

10. The braking device according to claim 6, wherein the brake unit is a disk brake having at least two brake pads that are actuated by the lever and that act on a brake disk embodied on the roller.

11. The braking device according to claim 9, wherein the brake shoes are spring-loaded against the brake actuation force.

12. The braking device according to claim 9, wherein the axle of the roller is joined rotation-fast to the roller support and a disk-shaped brake support is seated thereon that bears both the lever and the brake shoes.

13. The braking device according to claim 10, wherein the brake pads are spring-loaded against the brake actuation force.

14. The braking device according claim 10, wherein the axle of the roller is joined rotation-fast to the roller support and a disk-shaped brake support is seated thereon that bears both the lever and the brake pads.

15. A braking device for roller skates, skateboards, or the like, comprising:
a roller support, a roller mounted axially movable in the roller support between a first freely rotatable position and a second braked position, and an actuatable brake unit that is supported relative to the roller support, wherein a brake actuation force of the brake unit is produced from a torque of the roller via a clutch unit having a downstream transmission unit, the clutch unit being open in the first position and closed in the second position, wherein the clutch unit has two coupling surfaces that are normal to an axle of the roller and can be brought into frictional engagement with one another, of which coupling the first is joined rotation-fast to the roller and the second is borne pivotable or rotatable about the axle so that torque can be decoupled, and further comprising a disk spring that acts between the first and second coupling surfaces.

16. A braking device for roller skates, skateboards, or the like, comprising:
a roller support, a roller mounted axially movable in the roller support between a first freely rotatable position and a second braked position, and an actuatable brake unit that is supported relative to the roller support, wherein a brake actuation force of the brake unit is produced from a torque of the roller via a clutch unit having a downstream transmission unit, the clutch unit being open in the first position and closed in the second position, wherein the transmission unit has a cam driven by an output of the clutch unit, which cam acts on a lever for producing the brake actuation force, and wherein the cam is spring-loaded against its actuation direction.

* * * * *